United States Patent
Smits

(10) Patent No.: US 10,121,073 B2
(45) Date of Patent: Nov. 6, 2018

(54) AGILE BIOMETRIC CAMERA WITH BANDPASS FILTER AND VARIABLE LIGHT SOURCE

(71) Applicant: Samsung Electronics Co., LTD., Gyeonggi-Do (KR)

(72) Inventor: Gerard Dirk Smits, Los Gatos, CA (US)

(73) Assignee: Samsung Electronics Co., LTD, Gyeonggi-Do (KR)

( * ) Notice: Subject to any disclaimer, the term of this patent is extended or adjusted under 35 U.S.C. 154(b) by 261 days.

(21) Appl. No.: 14/621,078

(22) Filed: Feb. 12, 2015

(65) Prior Publication Data

US 2015/0227790 A1   Aug. 13, 2015

Related U.S. Application Data

(60) Provisional application No. 61/939,172, filed on Feb. 12, 2014.

(51) Int. Cl.
G06F 21/32    (2013.01)
G06K 9/00     (2006.01)

(52) U.S. Cl.
CPC ................................ G06K 9/00604 (2013.01)

(58) Field of Classification Search
CPC ...... G06K 9/00; G06K 9/00604; H01S 5/125; G01B 11/00; G08B 21/06

USPC .......................................................... 348/78
See application file for complete search history.

(56) References Cited

U.S. PATENT DOCUMENTS

| | | | |
|---|---|---|---|
| 2006/0088193 A1 | 4/2006 | Muller et al. | |
| 2008/0232418 A1 | 9/2008 | Anan | |
| 2010/0245093 A1* | 9/2010 | Kobetski ................. | A61B 5/18 340/576 |
| 2010/0284027 A1 | 11/2010 | Scheiner | |
| 2010/0316083 A1 | 12/2010 | Chang-Hasnain et al. | |

FOREIGN PATENT DOCUMENTS

WO    2012086966    6/2012

* cited by examiner

*Primary Examiner* — Sathyanaraya V Perungavoor
*Assistant Examiner* — Patricia I Young

(57) ABSTRACT

A system and method for authenticating a user of a device. A biometric camera system includes a light source having a variable illumination wavelength output, and a camera including an imaging sensor and a bandpass filter for filtering ambient illumination received at the imaging sensor. An optical image of a user, for example an image of an iris, is generated by illumination from the light source, filtered by the bandpass filter, and received at the imaging sensor. An authentication status of the user can be determined using the image.

19 Claims, 9 Drawing Sheets

AGILE BIOMETRIC CAMERA WITH BANDPASS FILTER AND VARIABLE LIGHT SOURCE

CROSS-REFERENCE TO RELATED APPLICATIONS

This application claims priority from U.S. Provisional Patent Application Ser. No. 61/939,172, filed Feb. 12, 2014, entitled "Iris Recognition Camera With Filter And Variable Light Source," the entire content of which is incorporated herein by reference.

FIELD OF THE INVENTION

Embodiments of the present disclosure generally relate to identifying a user of a device. More specifically, embodiments of the present disclosure relate to authenticating a user of a mobile device.

BACKGROUND

Many methods have been proposed for user identification through biometrics. One of the more promising techniques is that of iris recognition. Various camera systems exist to capture images of the iris. One of the challenges of biometric camera systems is operating in ambient light, e.g. being able to capture images of the iris in full sunlight, with sufficient discrimination at an imaging sensor to determine the identity of the person. Bright ambient light, particularly in the near infrared (NIR) region, can saturate the image sensor, and can also create shadows that make it difficult to capture a consistent iris image.

SUMMARY

Exemplary embodiments of the present disclosure include a biometric camera system for authenticating a user of a device. The camera system includes a light source having a variable illumination wavelength output, and a camera including an imaging sensor and a bandpass filter for filtering ambient illumination received at the imaging sensor. An optical image of a user, for example an image of an iris, is generated by illumination from the light source, filtered by the bandpass filter, and received at the imaging sensor. An authentication status of the user can be determined using the image.

According to an aspect of the present disclosure, a biometric camera system for a mobile device includes a light source positioned on the mobile device and configured to illuminate a person at a controlled wavelength during an image capture. The system includes a biometric camera positioned on the mobile device, the biometric camera including an imaging lens and a bandpass filter positioned along a focal axis of the imaging lens and operable to filter ambient illumination, and to transmit illumination of the controlled wavelength. The biometric camera further includes an imaging sensor positioned along the focal axis of the imaging lens, such that the bandpass filter is between the imaging lens and the imaging sensor. The imaging sensor is configured to convert an optical image of the person into an electronic signal for generating a video image of the person. The biometric camera further includes a processor configured to receive the video image of the person and to determine an authentication status of the person.

In an embodiment of the system the image of the person includes an iris of the person, and the authentication status is determined by a match of the iris with a previously registered image stored in an iris database. According to an embodiment the bandpass filter includes at least two distributed Bragg reflectors (DBRs) positioned relative to one another to define an illumination transmission band. According to a further embodiment the controlled wavelength and the transmission band include wavelengths in the near infrared (NIR) spectrum. According to an embodiment the light source includes a vertical cavity surface emitting laser (VCSEL) configured to emit illumination within a range of controlled wavelengths. According to an embodiment the biometric camera further includes a visible light filter disposed between the imaging lens and the imaging sensor. According to a further embodiment the imaging sensor is configured to activate a subset of imaging elements of the imaging sensor in a time-varying manner, the activation based upon a determined position of an optical image of the iris on the imaging sensor.

According to another aspect of the present disclosure, a method of capturing an image of a person for biometric identification includes illuminating a person with a light source during an image capture, the light source adjacent to a camera system that includes a bandpass filter and an image sensor. The camera system and the light source are housed in a mobile device. The method includes filtering ambient illumination during the image capture with the bandpass filter, and receiving reflected illumination of the person during the image capture at the image sensor. The method includes generating an electrical signal corresponding to the reflected illumination of the person, and processing the electrical signal to generate an image of the person. The method includes determining an authentication status of the person based on the image of the person.

In an embodiment of the method the image of the person includes an iris of the person, and the authentication status is based upon a match of the iris of the person with a previously registered iris image stored in an iris database. According to an embodiment a region of the imaging sensor corresponding to a position of the iris is determined by an initial series of image captures. According to a further embodiment an emission power of the light source is variable and the initial series of image captures is captured at a low emission power of the light source. According to a further embodiment the position of the iris is used to set a value of a controlled wavelength emitted by the light source such that the controlled wavelength, in cooperation with the filtering, causes the imaging sensor to receive reflected illumination of the iris at the region of the imaging sensor corresponding to the position of the iris. According to a further embodiment the determined position of the iris is used to activate a subset of the image sensor during image capture. According to an embodiment the light source emits illumination at a controlled wavelength and at a controlled angle, the controlled wavelength corresponding with an acceptance band of the bandpass filter.

According to another aspect of the present disclosure, a mobile apparatus operable for biometric user authentication includes a processor, a memory storing an iris database and operatively coupled to the processor, and an illumination source configured to emit illumination at a controlled wavelength, the illumination operable for illuminating an iris of a subject. The apparatus includes a camera, the camera including an imaging lens, a bandpass filter positioned along a focal axis of the imaging lens to reject ambient illumination outside of the controlled wavelength during image capture, and an imaging sensor positioned along the focal axis of the imaging lens such that the bandpass filter is positioned between the imaging lens and the imaging sensor. The imaging sensor of the apparatus is configured to convert an optical image of the iris into an electronic signal for generating a video image of the iris, and the processor is configured to receive the video image of the iris and attempt to match the video image of the iris with a previously registered image stored in the iris database, where the subject is authenticated if a match is determined.

In an embodiment of the apparatus the bandpass filter includes at least two distributed Bragg reflectors (DBRs). According to an embodiment the apparatus includes an RGB front-facing camera, and the processor is configured to determine a position of the iris based on an environment image captured using the RGB front-facing camera. According to an embodiment the light source includes an array of light emitting diodes (LEDs), and LEDs of the array are individually addressable. According to a further embodiment an inner portion of the array includes LEDs operable to emit at a first wavelength, and a remaining portion of the array includes LEDs operable to emit at a second wavelength, wherein the first wavelength is greater than the second wavelength. According to a further embodiment LEDs of the array are disposed to emit illumination at varying angles with respect to a top surface of the array.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
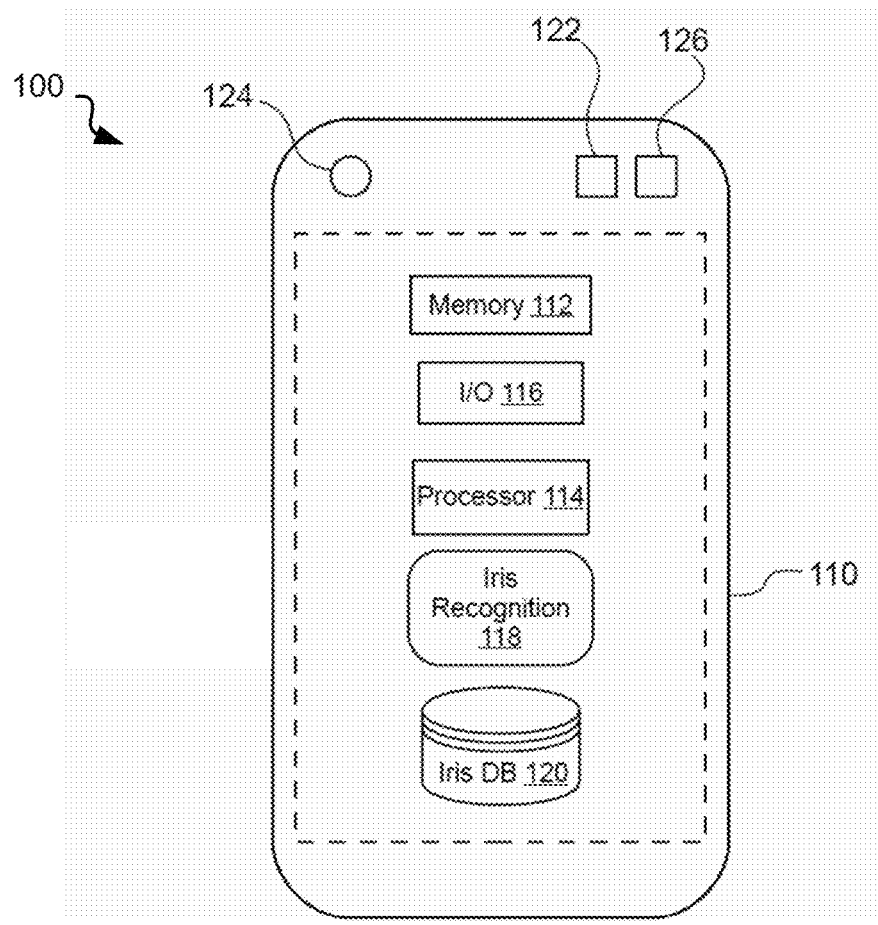
FIG. 1 is a block diagram illustrating an exemplary embodiment of a mobile device biometric camera system according to an embodiment of the present disclosure.

A system and method are described herein providing a biometric camera system that can be realized in a mobile device such as a smartphone or tablet, and which is able to reduce power consumed and increase biometric imaging specificity for authenticating a user, while maintaining safe operation for the user.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which can be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments can be practiced without these specific details or with equivalents thereof. In other instances, well-known methods, procedures, components, and circuits have not been described in detail as not to unnecessarily obscure aspects and features of the subject matter.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module can advantageously be configured to reside in the addressable storage medium and configured to execute on one or more processors. Thus, a component or module can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules can be combined into fewer components and components or modules or further separated into additional components and components or modules.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram is depicted illustrating an exemplary embodiment of a mobile device biometric camera system. A mobile device 100 has components including a memory 112, at least one processor 114, input output devices (I/O) 116, an RGB front-facing camera 122, and a display 110.

The memory 112, the processor 114, the I/O 116, the front-facing camera 122 and the display 110 can be coupled together via one or more system buses (not shown). The memory 112 can comprise one or more memories comprising different memory types, including RAM, ROM, cache, virtual memory and flash memory, for example. The processor 114 can include a single processor having one or more cores, or multiple processors having one or more cores. The I/O 116 is a collection of components that input information and output information. Example components comprising the I/O 116 can include a microphone, speaker, and a wireless network interface controller (or similar component) for communication over the network. The processor 114 can execute an operating system (OS) that manages hardware resources and performs basic tasks. Examples of the OS can include Symbian™, BlackBerry OS™, (OS™, Windows™, and Android™. In one embodiment, the display 110 can be integrated with the mobile device 100, while in another embodiment the display 110 can be external to the mobile device 100.

In one embodiment, the mobile device 100 can comprise any type of mobile device form factor, including but not limited to: a cell- or smart-phone; a tablet; a notebook or laptop computer; a television; and a wearable computer, for example. In one embodiment, the mobile device 100 can be implemented with the display 110 and the front-facing camera 122 located on the same side of the mobile device 100, such that the front-facing camera 122 is pointed at a user as the user holds the device to view the display 110. In the embodiment where the mobile device 100 comprises a laptop or notebook, the front-facing camera is typically housed within a lid of the laptop.

According to an exemplary embodiment, the mobile device 100 is provided with a biometric camera system. The biometric camera system can be used, for example, to capture images of the human iris for user identification and authentication. In one embodiment, the biometric camera system can include a near infrared (NIR) light source 124, a biometric camera 126, an iris recognition component 118 and an iris database 120. In one embodiment, the iris recognition component 118 and the iris database 120 are software components stored in the memory 112 and executed by the processor 114.

As shown, in one embodiment the biometric camera 126 is located in one corner of the mobile device 100 (although other locations are possible), while the NIR light source 124 can be located in an opposite corner, to offset the NIR light source 124 from the biometric camera 126 within the body of the mobile device 100. In one embodiment, the NIR light source 124 can be implemented using micro light emitting diodes (LEDs), or a laser diode. Light source 124 can be situated normal to the plane of the biometric camera 126, or in some embodiments the NIR light source 124 can be angled. For example, light source 124 can be angled slightly upward to point toward a user's eye, located at an expected distance from mobile device 100 when held normally by the user. Alternatively, light source 124 can be angled slightly toward the biometric camera 126 to reflect more brightly the illuminated eye at the biometric camera 126.

In operation, the NIR light source 124 illuminates a user of the mobile device 100 (e.g., with near infrared light) during image capture of the user's iris by the biometric camera 126. Video images output from the biometric camera 126 are received by the iris recognition component 118, which determines an authentication status of the user. For example, the authentication status of the user is determined via attempts to match the image of the iris with previously registered images stored in the iris database 120. If a match is found, then the user is able to be authenticated. The iris recognition component 118 can include the use of a Gabor filter to extract the features of an iris, though different filtering or feature extraction techniques may be utilized. The iris features, which are unique to a given iris, can be quantized for conversion to binary form, after which the Hamming distance may be used as a classifier for comparison between different binary iris features (e.g., comparison with irises from iris database 120). Other iris matching techniques are consistent with the spirit and scope of the present disclosure.

Ambient light presents a difficulty for capturing an image of the user (e.g., an iris) with adequate detail to perform an image match with pre-registered images. Ambient light can saturate an imaging sensor and overwhelm the signal (that is, the reflected illumination from the user, such as the iris). Therefore, according to embodiments of the present disclosure, a bandpass filter is used to restrict the bandwidth (e.g., spectrum) of light reaching the image sensor.

Figure 2:
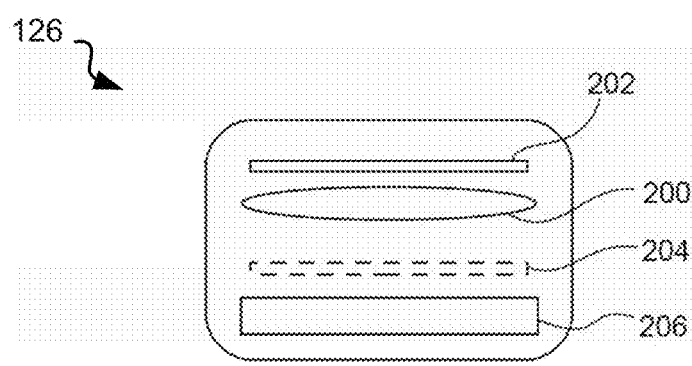
FIG. 2 is a block diagram illustrating components of a biometric camera for a mobile device according to an exemplary embodiment of the present disclosure.

Referring now to FIG. 2, a block diagram of a camera 126 is depicted according to an embodiment of the present disclosure. According to an embodiment, the camera 126 is operable to function as an iris recognition camera. The camera 126 can include an imaging lens (or lens system) 200 configured to focus incident illumination onto an image sensor 206, along a lens focal axis. Ambient light is decreased significantly by the addition of a bandpass filter 202. Optionally, in some embodiments a visible light filter 204 can be added to increase ambient light rejection, the visible light filter 204 serving to broadly block visible light while permitting IR light to pass.

The bandpass filter 202 can be an interference filter, and can comprise, for example, distributed Bragg reflectors (DBR) placed in a stacked configuration. Although a DBR can act as a narrow bandwidth reflectors when used individually, when placed in a stacked configuration at close proximity (e.g., at specified distances related to transmission wavelength), DBRs can act as narrow band transmission filters with a high degree of rejection outside of the band. According to an embodiment, the bandpass filter 202 comprises a material such as gallium arsenide (GaAs), although other materials are able to be used. The DBRs for use as a bandpass filter can be fabricated via deposition of GaAs, as well as other similar materials (e.g., indium gallium arsenide (InGaAs) and others). According to an embodiment, doped versions of GaAs with different indices of refraction can produce the required structures for the DBR. The simplest form of bandpass filter 202 has a relatively narrow bandpass (e.g., transmission band), on the order of a few nanometers (nm). However, by using different indices of refraction between the two DBRs, or by varying the thicknesses of layers of the DBRs, the bandwidth can be tuned to be substantially wider than this (e.g., tens to hundreds of nm).

For image sensing applications the bandwidth of a filter is often of moderate width (e.g., tens of nm). Filters such as these described function by control of the thicknesses of layers near to each other, in order to create the proper interferences between the filters. When the angle of incidence of a light beam is other than normal to the surface of the filters, a shift in the center wavelength of the light beam results. This shift follows the equation:

$$\lambda_c = \lambda_0 \sqrt{1 - \frac{\sin^2\theta}{n^{*2}}}$$

where $\lambda_c$ is the shifted central wavelength, $\lambda_0$ is the central wavelength at normal incidence, and n* is the effective index of refraction of the base filter material. Since GaAs has a high n* (n*≈3.3), the shift effect is not large. Therefore, filters composed with GaAs can be designed to have a narrow bandwidth, and thereby reject a substantial amount of ambient light. If a larger shift effect is desired for angles of incidence away from normal to the surface of the filter, a material (or combination of materials) having a lower index of refraction can be selected.

For a camera designed to image the iris, design tradeoffs exist between the field of view and the image sensor resolution. The camera preferably has a sufficiently wide field of view so that the camera does not need to be pointed precisely at the iris in order to image the iris. However, the field of view should not be so wide that the image of the iris is too small on the image sensor to provide enough detail for recognition by the iris recognition system. In one example, for a wavelength of 840 nm as $\lambda_0$ and a camera where the field of view is 30° (half-angle), and a GaAs filter is employed, the center wavelength $\lambda_c$ can shift by as much as 10 nm from the center to the edge of the image. If the bandwidth of the filter is made wider (e.g., by use of a filter using a different material than GaAs) more light is able to pass through, however, more ambient light will enter as well. In the case where a different material is chosen for the filter, for example a material having a much lower index of refraction, the shift in central wavelength is higher for a given angle away from the normal to the surface.

In an embodiment, the bandpass filter 202 is configured to be narrow (e.g., a few nm) to restrict the amount of light entering the imaging sensor 206. In one embodiment, the light source 124 can be a cone of light that evenly illuminates the field of view. The light source 124 is configured to have an illumination bandwidth wide enough to cover the acceptance wavelengths (e.g., transmission band) of the bandpass filter 202, for the angles within the field of view. While reducing ambient light improves image sensing at the image sensor 206, further power savings can be gained by refraining from illuminating portions of the scene that are not able to pass through the bandpass filter.

According to an embodiment, the light source 124 is configured to have a narrow bandwidth (e.g., approximately 10 nm, or a several tens of nm), corresponding to the narrow bandwidth of the bandpass filter 202. This serves to lower the overall power requirement of the camera system, while still adequately illuminating the iris. Further, the light received at the imaging sensor 206 is limited as well. An embodiment of light source 124 has a fixed output wavelength of illumination, resulting in only a portion of the image being illuminated due to the wavelength dependency of the transmission of illumination on the bandpass filter 202.

By employing a light source 124 that is tunable, portions of the image that are detectable by the sensor can be shifted to different regions of the image sensor. In a particular embodiment, the light source 124 is a vertical-cavity surface emitting laser (VCSEL). A VCSEL can be made tunable in several ways, including heating (for small wavelength changes) and micro-electromechanical system (MEMS) devices that change the cavity length of the VCSEL (to induce a wider change in wavelength). Although the output of a VCSEL can have an angular dependency, this angular dependency can be minimized by output of the VCSEL being sent first through a beam expander, so that the output illumination covers the entire field of view. Particularly for iris imaging applications, such a setup is able to limit the intensity of light necessary for illuminating the eye to a safe level.

Figure 3A:
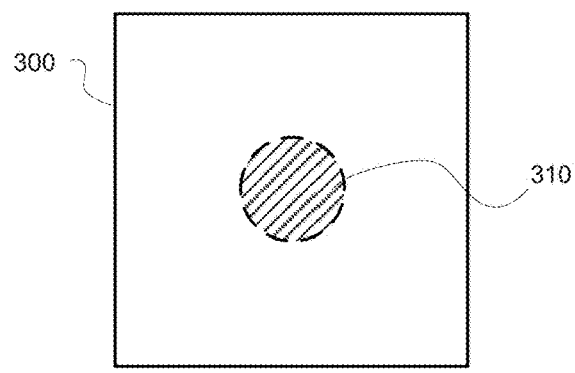
FIGS. 3A, 3B, and 3C are diagrams showing images taken with a biometric camera with varying wavelength illumination, according to exemplary embodiments of the present disclosure.

In one example, a VCSEL is chosen with a tunable wavelength band of 830-840 nm, the VCSEL outputting at a set wavelength within this band and having a bandwidth of +/−1 nm (e.g., central wavelength of 840+/−1 nm). FIG. 3A shows a schematic image 300 as captured by an image sensor (e.g., image sensor 206) that is set behind a filter (e.g., filter 202) having a central pass band at 840 nm. In FIG. 3A, the VCSEL is set at a wavelength of 840 nm. Area 310 of the image is transmitted through the filter to be captured by the image sensor. Although the entire field of view is illuminated by the VCSEL, only a portion is detected by the image sensor; the rest of the field of view is largely cut off by the angular dependence of the filter. Specifically, the portion sufficiently close to the axis normal to the filter 202 received incident illumination.

Figure 3B:
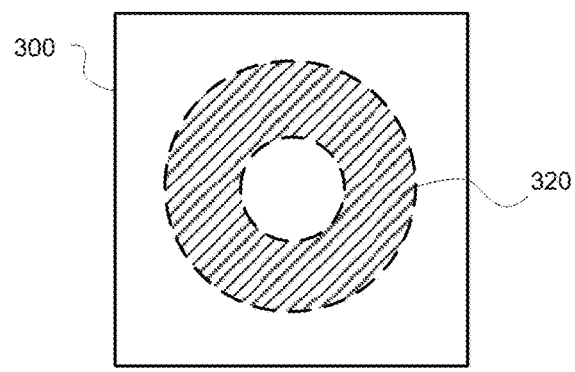

Referring now to FIG. 3B, the image 300 from a VCSEL having a wavelength tuned to a shorter wavelength than the central pass band (e.g. tuned to 835 nm) is depicted. In particular, area 320 shows the portion of the field of view that is imaged for central pass band of 840 nm and a tuned illumination wavelength of 835 nm, for example. Of course, these numbers are merely exemplary; many other wavelength and bandwidth ranges are able to be chosen to have similar effect.

Figure 3C:
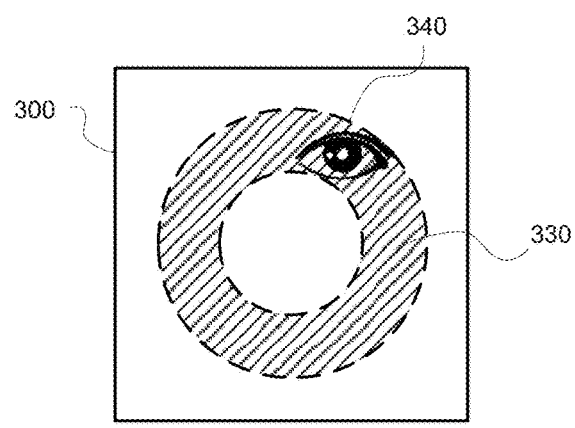

FIG. 3C shows a schematic diagram where an image of an iris is captured for processing, according to an embodiment of the present disclosure. Here, an iris 340 is illuminated by a wavelength of a VCSEL so that the image 300 captures the area ring 330 of that wavelength, the area 330 including the iris. The particular wavelength that is selected for imaging can be determined in multiple ways. In one embodiment, the VCSEL can be scanned through its range of output wavelengths, and the image at selected wavelengths can be analyzed to find the wavelength providing the best illumination for the eye. In a particular embodiment, the iris can be recognized by a number of methods known in the art, and the image with the most detail is chosen as the best wavelength for further imaging. In another embodiment enabling reduced imaging processing, the specular reflections off the cornea of the eye are measured, and the wavelength corresponding to the maximum reflection is determined. Once the iris is illuminated with the selected wavelength of light, the image can be taken for iris recognition at that wavelength.

Another method of determining an advantageous wavelength for measuring the iris is by combining information from the biometric camera 126 with that of an additional camera. Embodiments according to the present disclosure include a front-facing camera 122 along with the biometric camera 126. The front-facing camera 122 can have a wider field of view than the biometric camera 126. The front-facing camera 122 can be used to identify the position of an iris that is also in the field of view of the biometric camera 126. Using this position, along with knowledge of the relative position of the cameras (e.g., distance between cameras situated on a face of a mobile device), the position of the iris is able to be calculated for the biometric camera. The appropriate wavelength can then be chosen to correspond to that position, for iris capture—that is, the output wavelength of the light source is controlled to account for the transmission band of the bandpass filter, in order to image the iris at the determined location of the imaging sensor.

In some embodiments, multiple images are taken of the iris and combined to provide more detail for analysis. In a particular embodiment, the bandwidth of the filter and the VCSEL is made sufficiently narrow so that only a portion of the iris is captured at the central VCSEL output wavelength (e.g., the ring area 330 can be narrower than the width of the iris). Alternatively the iris is able to be closer to the camera and thus larger in the image, with a similar result. In these embodiments illumination wavelengths from the VCSEL are able to be scanned during the image acquisition to capture the entire iris in one or several image captures. In another embodiment, the filter is able to be constructed using materials with a lower index of refraction than that of GaAs. In such an embodiment, the wavelength shift in angle is more pronounced, effectively reducing the size of the capture ring (e.g., capture ring 330) of a given wavelength band, as well as further reducing the sensitivity to ambient light. In this case, the bandwidth of the light source is able to be chosen to match the acceptance band of the filter, enabling image capture at a lower power for a similar image quality.

Figure 4:
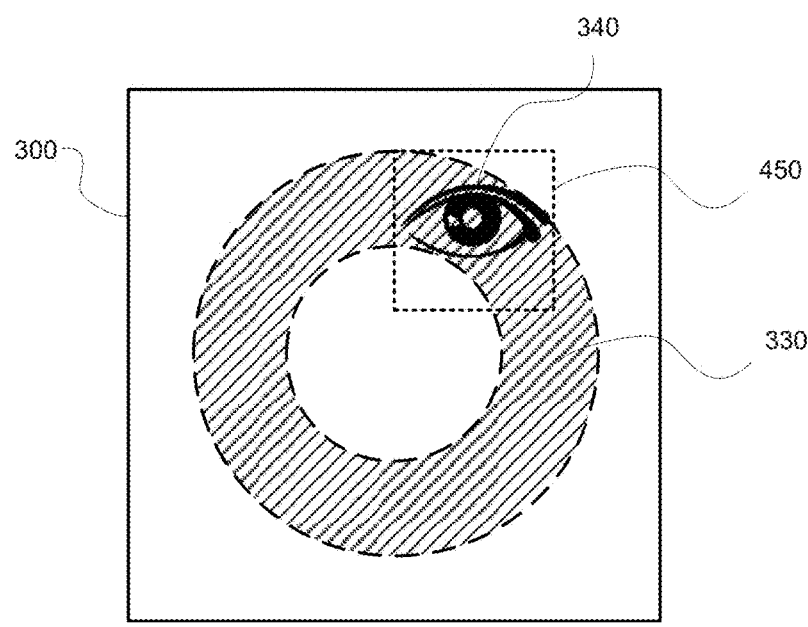
FIG. 4 is a diagram of an image of an iris taken with a biometric camera, according to an exemplary embodiment of the present disclosure.

Referring now to FIG. 4, an embodiment of the present disclosure is depicted where ambient light rejection is able to be further improved. In this embodiment, rather than acquiring the entire image sensor frame 300, only a portion corresponding to the eye position 340 is captured, for example eye box 450. A read out of the eye box 450 alone is able to be processed much more quickly than the entire image frame 300. This can be accomplished via, for example, using a row-column shutter variant of a rolling shutter. In a particular embodiment where a row-column shutter cannot be used, it is possible to read out only the horizontal lines corresponding to the eye box 450. The read out time is still reduced compared to reading out the entire image sensor, with concomitant improvement in ambient light rejection. In one embodiment, the VCSEL timing is able to be synchronized with the rolling shutter of the image sensor to only activate the light source 124 while the reflection of the iris 340 is imaged at the image sensor (e.g., light source 124 tuned to capture at ring 330). In this manner a brighter light level is able to be used to improve image quality, while still maintaining eye safety. In a particular embodiment, the VCSEL timing synchronization is able to be used in tandem with row-column shutter or similar techniques.

Figure 5:
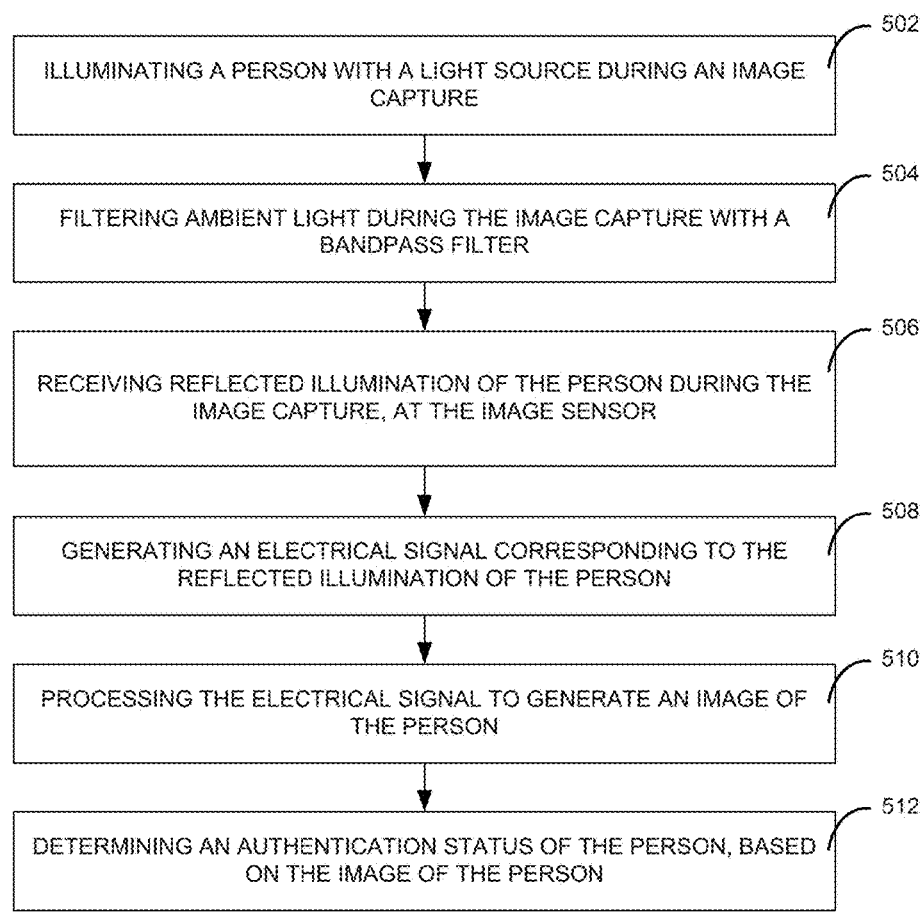
FIG. 5 is a flowchart showing an exemplary process of determining an authentication status of a user of device, according to an exemplary embodiment of the present disclosure.

Referring now to FIG. 5, a flowchart 500 depicts an example of a method for determining an authentication status of a person according to embodiments of the present disclosure. The flowchart 500 can be implemented as computer-executable instructions residing on some form of non-transitory computer-readable storage medium.

In block 502 a person is illuminated with a light source during an image capture. The light source (e.g., light source 124) can be a tunable light source, that is, a light source having an output wavelength that can be selected from a range of output wavelengths.

In block 504 ambient light is filtered with a bandpass filter, during the image capture. The bandpass filter (e.g., bandpass filter 202) can be formed by, for example, stacked DBRs, where a distance between the stacked DBRs determines a transmission band for the bandpass filter. According to embodiments of the present disclosure, the output wavelength of the light source is selected to correspond with the transmission band for the bandpass filter.

In block 506 reflected illumination is received at an image sensor, the reflected illumination from the person being illuminated at block 502. According to embodiments of the present disclosure, the image sensor (e.g., image sensor 206) can be read out only in a region where reflected illumination from a person's iris is received. According to embodiments, the region where the optical image of the iris is located at the image sensor is determined by an initial image or series of images. The initial image can be captured using an additional camera, for example, RGB camera 122. Alternatively or additionally, the initial image can be taken using low power setting of the light source. The light source can be tuned through a range of output wavelengths, and the location of the optical image of the iris on the imaging sensor can be determined.

In block 508 an electrical signal is generated that corresponds to the reflected illumination from block 506. The electrical signal can be generated by an image sensor (e.g., image sensor 206), and forwarded to a processor (e.g., processor 114).

In block 510 the electrical signal is processed (e.g., via processor 114) to generate an image of the person illuminated in block 502.

In block 512 a determination is made of an authentication status of the person, based on the image generated at block 510. The authentication status can be determined according to an iris recognition (e.g., iris recognition 118) process. For example, the image of the person can be an image of an iris, and the iris can be matched against a set of iris images stored in a previously registered iris database (e.g., iris database 120). According to an embodiment, if a match is made between the present iris image and an iris image from the registered database, the person is authorized to use the device (or a program or function operated from the device).

Figure 6A:
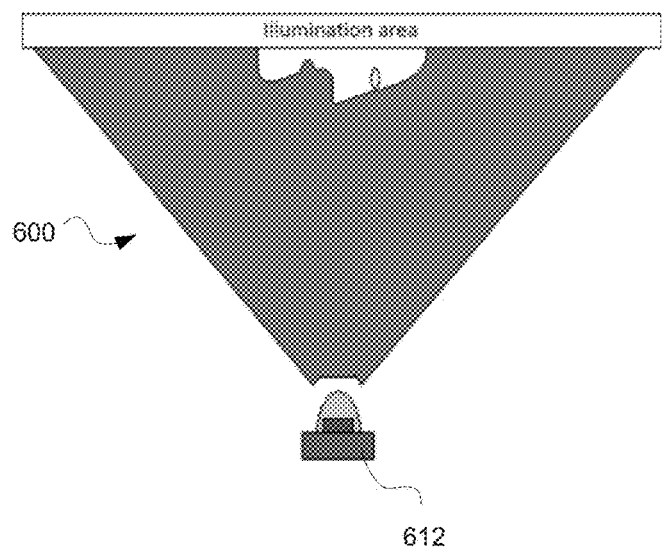
FIG. 6A is a diagram of a single LED illuminating a target, according to an exemplary embodiment of the present disclosure.

Although a tunable VCSEL provides a convenient light source to achieve coverage over the field of view of a biometric camera 126, other illumination sources are possible. For example, a single LED is able to be used to illuminate the field of view (including a face) for iris recognition. Referring now to FIG. 6A, an embodiment depicts a single LED 612 that is able to be used as a light source, where wavelengths of the illumination are spread out spatially. The spatial spread of the illumination is depicted by field 600. The illumination can be spatially spread by, for example, refraction using prisms, or by diffractive means (e.g., via a transmissive diffraction grating). In practice the use of a single LED 612 for a light source can be wasteful, for example in those scenarios where the iris of the user is not present. Further, an LED illuminating over a broad wavelength spectrum is wasteful in terms of the wavelengths of the illumination that do not pass through the bandpass filter, that is, the rejected wavelengths.

Figure 6B:
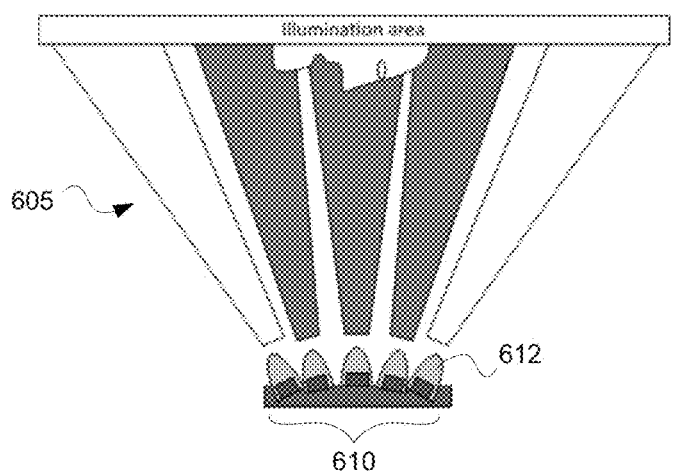
FIG. 6B is a diagram of an LED array illuminating a target, according to an exemplary embodiment of the present disclosure.

In an embodiment, an array 610 of LEDs 612 can be used to illuminate the scene. Referring now to FIG. 6B, an array 610 of LEDs 612 can be used to cover the entire field of view of the imaging sensor. Here, the LEDs 612 are positioned in the array 610 such that the central angle of each light cone emanating from each LED varies. According to some embodiments, LEDs 612 are chosen to have a relatively narrow illumination solid angle 605, and are placed so that light from adjacent LEDs overlap only minimally, if at all. According to other embodiments, some amount of overlap is configured for additional selective lighting at a particular point or points of interest on the imaging sensor. While only a 1-dimensional array in FIG. 6B, in practice a 2-dimensional array is used to cover the solid angle field of view of systems of the present disclosure. In one embodiment, the LEDs 612 are coupled together such that they are all activated (e.g., turned on or off) simultaneously. In some embodiments LEDs 612 are able to be individually addressable, and activated and deactivated on an individual basis. In some embodiments LEDs 612 are able only to be turned on and off, while in other embodiments each LED 612 can be turned off or set to a particular lighting level independent of other LEDs in the array 610.

Figure 7:
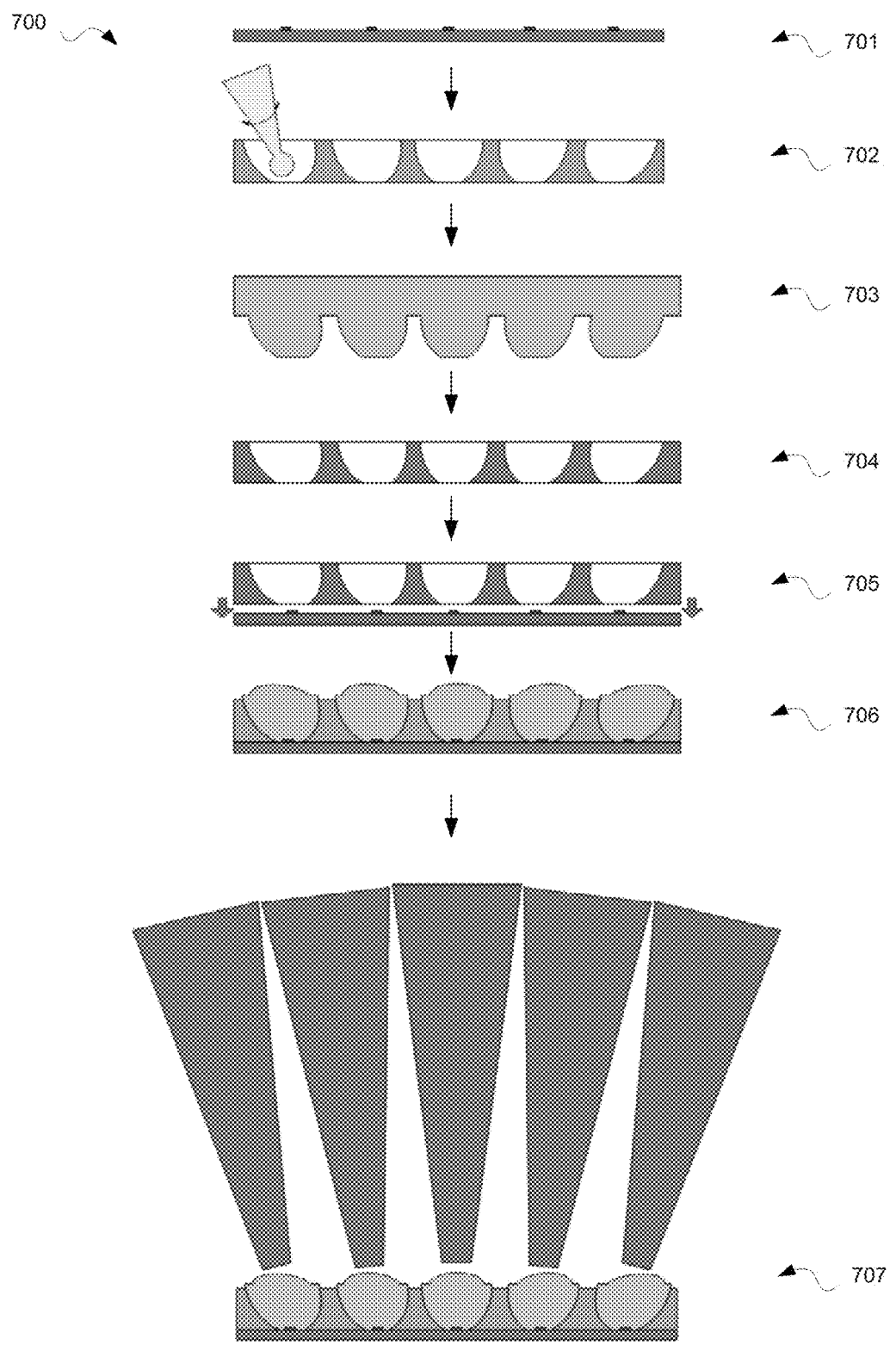
FIG. 7 is a process diagram showing an exemplary method of creating an LED array, according to an exemplary embodiment of the present disclosure.

According to some embodiments, the LED array 610 is able to be generated from individually packaged LEDs. However, in a mobile device space is often at a premium. One way to achieve miniaturization is by generating an LED array 610 using wafer level processing. In one exemplary embodiment, the LED array 610 is generated by a process illustrated in FIG. 7. In process 700, a carrier wafer is first populated by LEDs in step 701 (electrical connection is not shown). According to an embodiment, the carrier wafer can include through-silicon vias (TSV).

In step 702, a diamond turned master wafer is formed. The diamond turned master wafer is formed with variation in pointing angle for the focal axis of different LEDs of the wafer. From the diamond turned master wafer, a molding sub master is generated in step 703. Replicated stamping and/or molding tooling can be generated from the master in step 703. According to embodiments of the present disclosure, the master wafer is shaped so that lenses modeled on its form will direct light from the various LEDs in different directions, and with a desired angular spread of illumination. Steps 702 and 703 can be omitted if a proper sub master has been previously created.

In step 704, a replicated reflector wafer is generated from the sub master and is coated for reflection. In step 705 the replicated mirror reflector wafer is bonded to the LED carrier wafer. In step 706 an encapsulant and/or lens material is molded to shape the upper surfaces of the LED lenses, if needed. Step 707 depicts the completed array after dicing, with each LED in its own micro-cup reflector with lens. As shown, the completed lens array die has a variation in beam pointing direction for different LEDs of the array.

Figure 8:
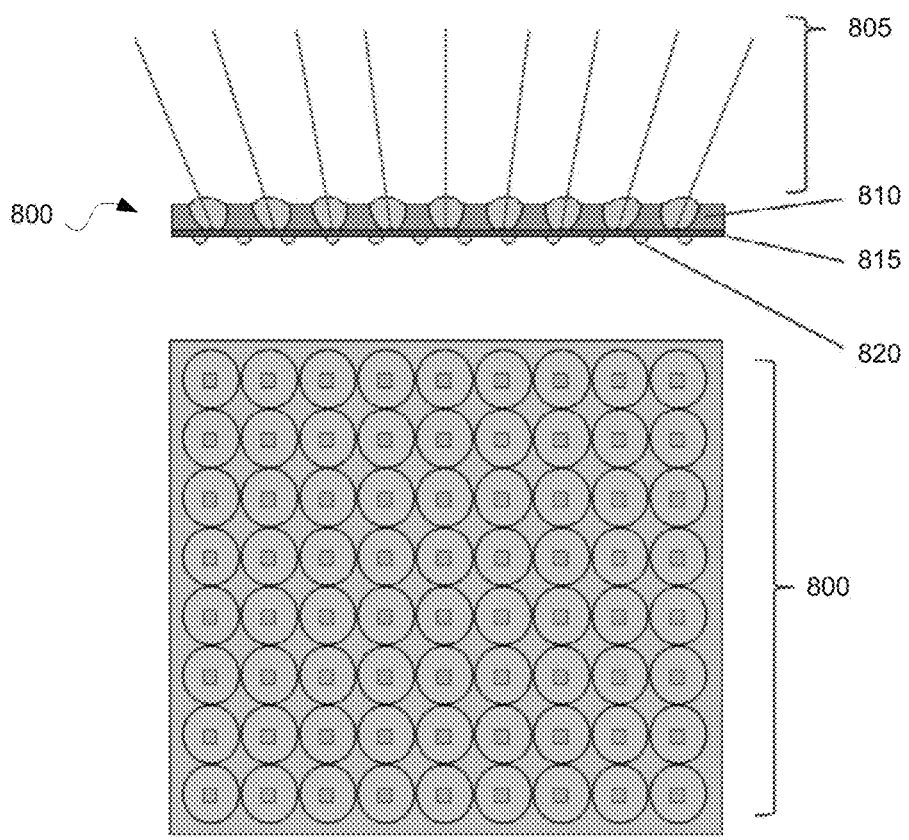
FIG. 8 shows a plane view of a completed packaged LED array, according to an exemplary embodiment of the present disclosure.

FIG. 8 depicts a completed LED array 800 according to an embodiment of the present disclosure, in both elevation and plan views. Array 800 includes individually addressable and controllable LEDs with tilted beam angles 805 to control illumination of a target in scene. As depicted, the LEDs of the array 800 are disposed at angles 805 such that illumination from the LEDs covers the field of view of a camera (e.g., biometric camera 126). The output angle of each individual LED is determined by the shape of its micro-mirror reflector cup 810. The LEDs can be made addressable via CMOS silicon 815 with incorporated LED control logic. The LED array 800 can include a backside redistribution layer (RDL) and solder ball interconnections 820, as well as other forms of interconnection.

According to an embodiment, all of the LEDs have the same output wavelength distribution. For an iris recognition application, the LEDs can be chosen with a wide bandwidth of wavelengths so that the LED lighting is able to pass through the camera filter (e.g., bandpass filter 202) at all angles in the field of view. The overall field of illumination is able to be chosen to match that of the biometric camera 126, although in a particular embodiment, the field of illumination might instead be chosen to match the wider field of view of the front facing camera 122. In this manner the LED array 800 is able to be used for multiple purposes. In both cases, power savings can be realized owing to the LEDs in the array 800 being individually addressable. For example, the camera is able to determine the position of the iris, either through using the front facing camera 122 or by lighting the entire field of view with the whole LED array 800 at low levels. Then, only the one or several LEDs that correspond to the optical position for illuminating the iris are turned on (e.g., either continuously or flashed at high power), and the biometric camera can be used to image an iris for identifying a user.

Figure 9:
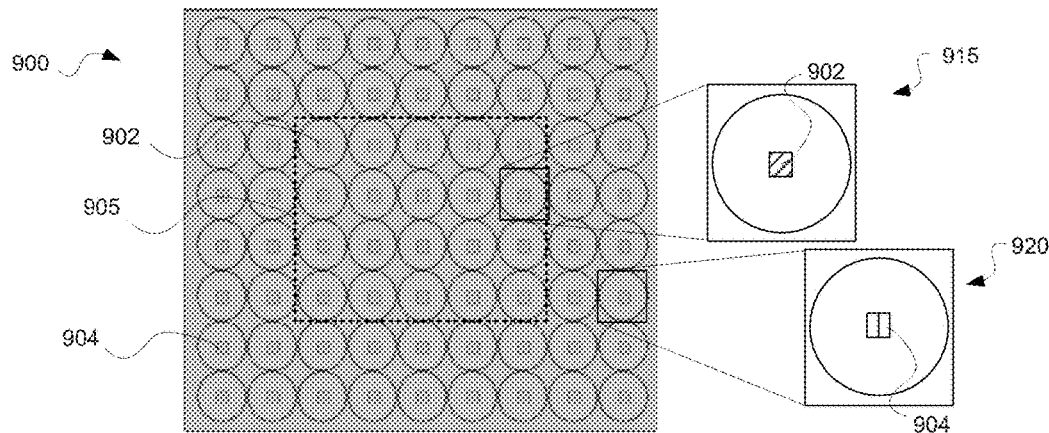
FIGS. 9, 10, and 11 depict in a plane view different embodiments of a completed packaged LED array, according to exemplary embodiments of the present disclosure.

FIG. 9 depicts an embodiment with an LED array 900 optimized to conserve power during image capture. In array 900 LEDs at the center of the array (e.g., in region 905) are configured to emit at one wavelength, while other LEDs (e.g., at the periphery) of the array are configured to emit at another wavelength. The central LEDs 902 of region 905 can be configured to have a central wavelength of, for example, 840 nm, and the outer LEDs 904 to have a central wavelength of 830 nm. Magnified images 915 and 920 depict LEDs 902 and 904 of the inner and outer region, respectively. Other wavelengths are able to be used, with the selection of wavelengths designed to spatially match the transmission band of the bandpass filter of the camera.

In a similar manner to the array 800 shown in FIG. 8, according to embodiments of the present disclosure only one or several LEDs need be turned on to capture an image (e.g., iris image). Power efficiency is thereby increased as only the wavelengths needed at a given angle are aimed in that particular direction, and thus less power is needed for illumination. Further, a similar amount of light is still maintained at the biometric camera image sensor. While the embodiments of FIG. 9 only depict two separate color LEDs (e.g., 902 and 904), in other embodiments the LED array 900 includes LEDs of three or more colors. Such an LED array enables wavelength variations that appear more granular when measured from the center toward the edge of the array. In general, a particular LED color is configured at each position in the LED array 900 such that the wavelength of the illumination from a particular LED substantially matches the central wavelength allowed through the camera filter at that angle of the camera's field of view.

Figure 10:
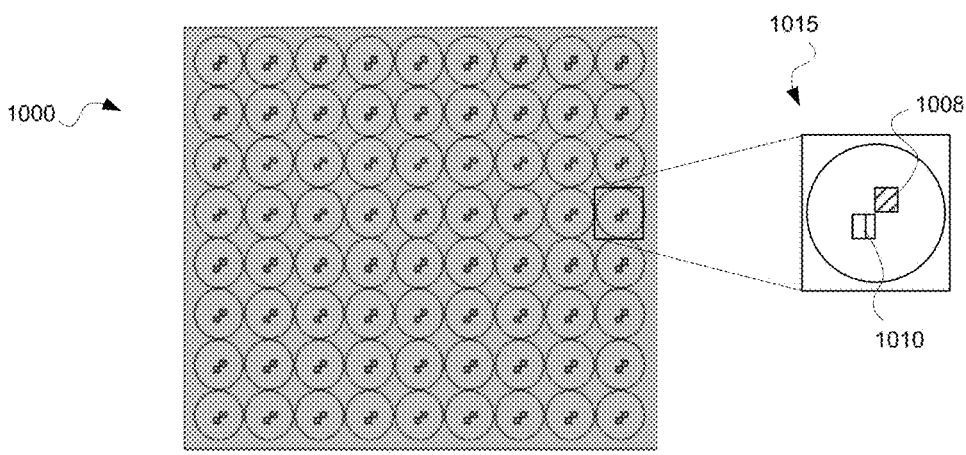

Referring now to FIG. 10, an embodiment of the present disclosure includes an array 1000 having LED micro-cups, where each micro-cup contains two LED elements. Magnified image 1015 depicts an LED micro-cup with a first LED element 1008 and a second LED element 1010. In one embodiment the two LED elements 1008 and 1010 are able to have one element with a central wavelength of 850 nm and another with a central wavelength of 650 nm, each LED element being independently addressable. Individual elements can be activated for specific imaging purposes. For example, an image of an iris can be obtained with much more detail at 850 nm than 650 nm when measuring brown eyes. In contrast, use of 650 nm lighting generates a better image when measuring blue eyes. According to an embodiment, the optical bandpass filter (e.g., bandpass filter 202) is able to be removed from the camera imaging path to allow both wavelengths to be measured at the camera. In so doing much more ambient light is sensed at the image sensor. In a particular embodiment, the filter is constructed so as to be a notched bandpass filter, where the pass-through wavelengths of the notch filter correspond to the multiple wavelengths of the LEDs disposed in LED array 1000. According to an embodiment the wavelengths of two LED elements 1008 and 1010 in each micro-cup are the same throughout the array 1000. According to another embodiment the wavelengths of each of the two LED elements 1008 and 1010 are able to be chosen to vary throughout the LED array 1000, for example in a similar manner to that of array 900.

Figure 11:
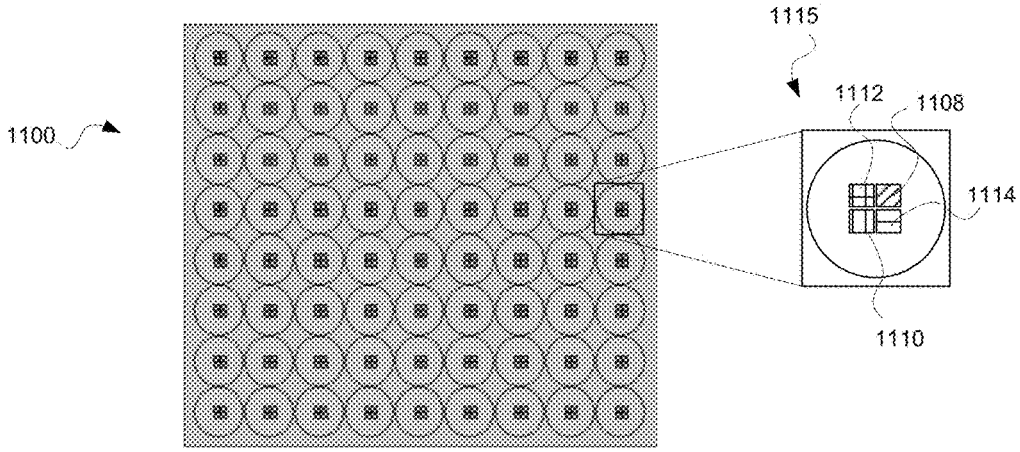

Referring now to FIG. 11, an embodiment is depicted where each micro-cup of an LED array 1100 contains up to four individually addressable LED elements 1108-1114. Magnified image 1115 depicts an LED micro-cup with a first LED element 1108, a second LED element 1110, a third LED element 1112, and a fourth LED element 1114. The four LED elements 1108-1114 can be selected to span the visible spectrum and parts of the NIR spectrum. Although array 1100 can be used for additional iris recognition modalities, an addressable angular array with varying colors and output power is able to be used for other illumination purposes as well, for example mood or other lighting (e.g., for use with front-facing camera 122). Other arrangements with greater or fewer than four LED elements are consistent with the spirit and scope of the present disclosure. For example, an LED array 1100 with only a green, blue, and a NIR LED element in each micro-cup is able to be used for iris recognition, where the NIR LED element is used for brown eyes, and both the green and blue LED elements for blue eyes. Other combinations of LED wavelengths and iris color capture are possible.

A method and system for a biometric camera system has been disclosed. The present invention has been described in accordance with the embodiments shown, and there could be variations to the embodiments, and any variations would be within the spirit and scope of the present invention. Aspects of the present disclosure can be embodied in a computer-readable media including program instructions to implement various operations embodied by a computer or computing device (e.g., a cellular phone, tablet device, etc.). The media can also include, alone or in combination with the program instructions, data files, data structures, and the like. The media and program instructions can be those specially designed and constructed for the purposes of the example embodiments of the present disclosure, or they can be of the kind well-known and available to those having skill in the computer software arts. Examples of computer-readable media include magnetic media such as hard disks, floppy disks, and magnetic tape, optical media, for example, CD ROM disks and DVD, magneto-optical media, for example, optical disks, and hardware devices that can be specially configured to store and perform program instructions, for example, read-only memory (ROM), random access memory (RAM), flash memory, and the like. Aspects of the present disclosure can also be realized as a data signal embodied in a carrier wave and comprising a program readable by a computer and transmittable over the Internet. Examples of program instructions include both machine code, for example, produced by a compiler, and files containing higher level code that can be executed by the computer using an interpreter. The described hardware devices can be configured to act as one or more software modules in order to perform the operations of the above-described example embodiments of the present disclosure.

Embodiments of the present disclosure are thus described. While the present disclosure has been described in particular embodiments, it should be appreciated that the present disclosure should not be construed as limited by such embodiments, but rather construed according to the following claims. Accordingly, many modifications can be made by one of ordinary skill in the art without departing from the spirit and scope of the appended claims.

What is claimed is:

1. A biometric camera system, comprising:
a light source disposed on a mobile device, the light source to output a first pulse of near infrared (NIR) light with a first center wavelength at a first time to illuminate an iris, and a second pulse of NIR light with a second center wavelength at a second time to illuminate the iris;
a biometric camera disposed on the mobile device, the biometric camera comprising:
an imaging lens;
a bandpass filter disposed along a focal axis of the imaging lens to receive light including the first and second pulses of NIR light reflected from the iris, the bandpass filter to filter light that lies outside of a range of wavelengths and to transmit light that lies within the range of wavelengths, the first and second pulses of NIR light reflected from the iris being transmitted through the bandpass filter;
an imaging sensor disposed along the focal axis of the imaging lens such that the bandpass filter is disposed between the imaging lens and the imaging sensor, the imaging sensor having a plurality of sensor regions, the imaging sensor to capture the first pulse of NIR light reflected from the iris and transmitted through the bandpass filter in a first sensor region of the plurality of sensor regions as a first captured pulse, and convert the first captured pulse into a first electrical signal, the imaging sensor to capture the second pulse of NIR light reflected from the iris and transmitted through the bandpass filter in a second sensor region of the plurality of sensor regions as a second captured pulse, and convert the second captured pulse into a second electrical signal, the first and second sensor regions being non-overlapping; and
a processor to generate first and second iris images in response to the first and second electrical signals, respectively, compare a characteristic of the first iris image to a characteristic of the second iris image to choose a selected iris image from the first and second iris images, compare the selected iris image to a previously registered iris image stored in an iris database, and grant authentication when the selected iris image matches the previously registered iris image, the characteristics of the first and second iris images include spectral reflections off of a cornea of an eye, the selected iris image having a maximum spectral reflection between the first and second iris images.

2. The system according to claim 1, wherein:
the tunable light source to scan through the range of wavelengths of NIR light to illuminate the eye with a series of substantially single wavelengths of NIR light;
the imaging sensor captures the series of substantially single wavelengths of NIR light reflected from the iris as a series of captured wavelengths, and converts the series of captured wavelengths into a series of scanned electrical signals; and the processor to generate a series of scanned images from the series of scanned electrical signals, compare a characteristic of each scanned image to identify a best illuminated scanned image from the series of scanned images, and select the wavelength of NIR light that was used to generate the best illuminated scanned image as the substantially single wavelength of NIR light to be output by the tunable light source.

3. The system according to claim 1, wherein:

the tunable light source to scan through the range of wavelengths of NIR light to illuminate the eye with a series of wavelengths of NIR light to generate spectral reflections off of a cornea of the eye; and the processor to select the substantially single wavelength of NIR light from the range of wavelengths of NIR light based on the wavelength of the series of wavelengths that has a maximum spectral reflection.

4. A biometric camera system, comprising:

a light source disposed on a mobile device, the light source to output a first pulse of near infrared (NIR) light with a first center wavelength at a first time to illuminate an iris, and a second pulse of NIR light with a second center wavelength at a second time to illuminate the iris, the light source to include a vertical cavity surface emitting laser (VCSEL), the VCSEL being tunable to output the first and second pulses of NIR light;

a biometric camera disposed on the mobile device, the biometric camera comprising:
  an imaging lens;
  a bandpass filter disposed along a focal axis of the imaging lens to receive light including the first and second pulses of NIR light reflected from the iris, the bandpass filter to filter light that lies outside of a range of wavelengths and to transmit light that lies within the range of wavelengths, the first and second pulses of NIR light reflected from the iris being transmitted through the bandpass filter;
  an imaging sensor disposed along the focal axis of the imaging lens such that the bandpass filter is disposed between the imaging lens and the imaging sensor, the imaging sensor having a plurality of sensor regions, the imaging sensor to capture the first pulse of NIR light reflected from the iris and transmitted through the bandpass filter in a first sensor region of the plurality of sensor regions as a first captured pulse, and convert the first captured pulse into a first electrical signal, the imaging sensor to capture the second pulse of NIR light reflected from the iris and transmitted through the bandpass filter in a second sensor region of the plurality of sensor regions as a second captured pulse, and convert the second captured pulse into a second electrical signal, the first and second sensor regions being non-overlapping; and
  a processor to generate first and second iris images in response to the first and second electrical signals, respectively, compare a characteristic of the first iris image to a characteristic of the second iris image to choose a selected iris image from the first and second iris images, compare the selected iris image to a previously registered iris image stored in an iris database, and grant authentication when the selected iris image matches the previously registered iris image.

5. The system according to claim 4, wherein the biometric camera further comprises a visible light filter disposed between the imaging lens and the imaging sensor, the visible light filter to substantially reduce the amplitudes of substantially all wavelengths of visible light.

6. The system according to claim 4, further comprising a visible-light camera disposed on the mobile device that captures a visible-light image of the iris; and wherein the processor to select the substantially single wavelength of NIR light based on the position of the iris relative to the position of the visible-light camera.

7. A method of biometric identification, the method comprising:

outputting a substantially single wavelength of near infrared (NIR) light from a range of wavelengths of NIR light to illuminate an iris of an eye, the substantially single wavelength of NIR light to reflect off of the iris;

substantially reducing the amplitudes of the wavelengths of light that lie outside of the range of wavelengths of NIR light, and passing all wavelengths of light that lie within the range of wavelengths of NIR light, including the substantially single wavelength of NIR light reflected from the iris, with relatively little reduction in the amplitudes of the wavelengths of light within the range of wavelengths of NIR light as compared to the wavelengths of light that lie outside of the range of wavelengths of NIR light;

capturing the substantially single wavelength of NIR light reflected from the iris and transmitted through the bandpass filter as a captured wavelength, and converting the captured wavelength into an electrical signal; and selecting the substantially single wavelength of NIR light to be output by the tunable light source from the range of wavelengths of NIR light based on light reflected from the iris, generating a current iris image in response to the electrical signal, comparing the current iris image with a previously registered iris image stored in an iris database, and granting authentication when the current iris image matches the previously registered iris image.

8. The method according to claim 7, further comprising scanning through the range of wavelengths of NIR light to illuminate the eye with a series of wavelengths of NIR light to generate spectral reflections off of a cornea of the eye, and selecting the substantially single wavelength of NIR light to be output from the range of wavelengths of NIR light based on the wavelength of the series of wavelengths that has a maximum spectral reflection.

9. The method according to claim 7, further comprising:

scanning through the range of wavelengths of NIR light to illuminate the eye with a series of substantially single wavelengths of NIR light;

capturing the series of substantially single wavelengths of NIR light reflected from the iris as a series of captured wavelengths, and converting the series of captured wavelengths into a series of scanned electrical signals; and generating a series of scanned images from the series of scanned electrical signals, comparing a characteristic of each scanned image to identify a best illuminated scanned image from the series of scanned images, and selecting the wavelength of NIR light that was used to generate the best illuminated scanned image as the substantially single wavelength of NIR light to be output.

10. The method according to claim 7, further comprising capturing the substantially single wavelength of NIR light in a first sensor region of a plurality of sensor regions, each sensor region having a plurality of imaging elements.

11. The method according to claim 10, and further comprising reading less than all of the imaging elements in the first sensor region to form the electrical signal.

12. The method according to claim 7, further comprising:
capturing a visible-light image of the iris; and
selecting the substantially single wavelength of NIR light based on the position of the iris relative to the position of the visible-light camera.

13. A method of biometric identification, the method comprising:
outputting a first pulse of near infrared (NIR) light with a first center wavelength at a first time to illuminate an iris, and a second pulse of NIR light with a second center wavelength at a second time to illuminate the iris, the first pulse and the second pulse being output by a light source, the light source includes an LED array that has a first region that outputs the first pulse of NIR light with the first center wavelength, and a second region that outputs the second pulse of NIR light with the second center wavelength;
receiving light including the first and second pulses of NIR light reflected from the iris, filtering light that lies outside of a range of wavelengths, and transmitting light that lies within the range of wavelengths, the first and second pulses of NIR light reflected from the iris being transmitted through the bandpass filter;
capturing the first pulse of NIR light reflected from the iris and transmitted through the bandpass filter in a first sensor region of the plurality of sensor regions as a first captured pulse, and converting the first captured pulse into a first electrical signal;
capturing the second pulse of NIR light reflected from the iris and transmitted through the bandpass filter in a second sensor region of the plurality of sensor regions as a second captured pulse, and converting the second captured pulse into a second electrical signal, the first and second sensor regions being non-overlapping;
generating first and second iris images in response to the first and second electrical signals, respectively, and comparing a characteristic of the first iris image to a characteristic of the second iris image to choose a selected iris image; and
comparing the selected iris image with a previously registered iris image stored in an iris database, and granting authentication when the selected iris image matches the previously registered iris image.

14. A mobile apparatus for biometric user authentication, the apparatus comprising:
a memory to store an iris database;
a light source having a plurality of lighting elements, the light source to output:
a first pulse of light with a first number of lighting elements at a first time to illuminate a scene that includes an iris and a number of other features, and
a second pulse of light with a second number of lighting elements selected from the first number of lighting elements at a second time to illuminate substantially only the iris, the second number of lighting elements being less than the first number of lighting elements, and being selected based on a location of the iris; and
a camera, comprising:
an imaging lens;
a bandpass filter disposed along a focal axis of the imaging lens to receive light including the first and second pulses of light reflected from the scene and substantially only the iris, respectively, the bandpass filter to filter light that lies outside of a range of wavelengths and to transmit light that lies within the range of wavelengths, the first and second pulses of light reflected from the scene and substantially only the iris, respectively, being transmitted through the bandpass filter; and
an imaging sensor disposed along the focal axis of the imaging lens such that the bandpass filter is disposed between the imaging lens and the imaging sensor, the imaging sensor to capture the first pulse of light reflected from the scene and transmitted through the bandpass filter as a first captured pulse, and convert the first captured pulse into a first electrical signal, the imaging sensor to capture the second pulse of light reflected from substantially only the iris and transmitted through the bandpass filter as a second captured pulse, and convert the second captured pulse into a second electrical signal; and
a processor to generate an image of the scene in response to the first electrical signal, determine the location of the iris from the image of the scene, generate an image of substantially only the iris in response to the second electrical signal, compare the image of substantially only the iris with a previously registered iris image stored in the iris database to determine an authentication status, and grant an authentication when the image of substantially only the iris matches the previously registered iris image.

15. The apparatus according to claim 14, wherein the first pulse of light is output at a low power level and the second pulse of light is output at a higher power level.

16. The apparatus according to claim 14 wherein each lighting element includes a plurality of light emitting diodes (LEDs), the plurality of LEDs in each lighting element including LEDs that emit visible light and LEDs that emit near infrared light.

17. The apparatus according to claim 14, wherein the plurality of lighting elements include an array of light emitting diodes (LEDs), and wherein LEDs of the array are individually addressable.

18. The apparatus according to claim 17, wherein a first portion of the array comprises LEDs operable to emit at a first wavelength, and a second portion of the array comprises LEDs operable to emit at a second wavelength, wherein the first wavelength is greater than the second wavelength.

19. The apparatus according to claim 17, wherein LEDs of the array are disposed to emit illumination at varying angles with respect to a top surface of the array.

* * * * *